United States Patent
Chokshi et al.

(10) Patent No.: US 10,235,608 B2
(45) Date of Patent: Mar. 19, 2019

(54) IMAGE QUALITY ASSESSMENT USING ADAPTIVE NON-OVERLAPPING MEAN ESTIMATION

(71) Applicant: The Nielsen Company (US), LLC, New York, NY (US)

(72) Inventors: Setu Chokshi, Singapore (SG); Venkadachalam Ramalingam, Tamilnadu (IN)

(73) Assignee: The Nielsen Company (US), LLC, New York, NY (US)

( * ) Notice: Subject to any disclaimer, the term of this patent is extended or adjusted under 35 U.S.C. 154(b) by 37 days.

(21) Appl. No.: 15/368,132

(22) Filed: Dec. 2, 2016

(65) Prior Publication Data

US 2017/0177979 A1    Jun. 22, 2017

(30) Foreign Application Priority Data

Dec. 22, 2015  (IN) .......................... 4238/DEL/2015

(51) Int. Cl.
| | |
|---|---|
| *G06K 9/62* | (2006.01) |
| *G06T 7/11* | (2017.01) |
| *G06K 9/46* | (2006.01) |
| *G06K 9/03* | (2006.01) |

(52) U.S. Cl.
CPC .......... *G06K 9/6284* (2013.01); *G06K 9/036* (2013.01); *G06K 9/4628* (2013.01); *G06T 7/11* (2017.01); *G06T 2207/20021* (2013.01)

(58) Field of Classification Search
None
See application file for complete search history.

(56) References Cited

U.S. PATENT DOCUMENTS

| | | | |
|---|---|---|---|
| 5,436,981 A | 7/1995 | Ishikawa | |
| 6,307,980 B1 | 10/2001 | Quacchia | |
| 7,142,697 B2 | 11/2006 | Huang et al. | |
| 7,317,842 B2 | 1/2008 | Lin et al. | |
| 7,512,286 B2 | 3/2009 | Luo | |
| 7,787,691 B2 | 8/2010 | Strom | |
| 8,693,544 B2 | 4/2014 | Lee | |
| 8,879,813 B1* | 11/2014 | Solanki | G06T 7/0014 382/128 |
| 9,025,883 B2 | 5/2015 | Bernal et al. | |
| 2006/0020597 A1* | 1/2006 | Keating | G06F 17/3025 |
| 2006/0126093 A1* | 6/2006 | Fedorovskaya | G06K 9/00255 358/1.14 |

(Continued)

*Primary Examiner* — Bernard Krasnic
(74) *Attorney, Agent, or Firm* — Hanley, Flight & Zimmerman, LLC

(57) ABSTRACT

Methods, apparatus, systems and articles of manufacture (e.g., physical storage media) to assess image quality using adaptive non-overlapping mean estimation are disclosed. Example image quality assessment methods disclosed herein include replacing respective blocks of pixels of a first image with mean values of the respective blocks of pixels to determine a second image having a smaller size than the first image. Disclosed example image quality assessment methods also include determining a vector of features for the second image. Disclosed example image quality assessment methods further include applying the vector of features to a neural network, and classifying a quality of the first image based on an output of the neural network.

20 Claims, 15 Drawing Sheets

(56) References Cited

U.S. PATENT DOCUMENTS

| | | | |
|---|---|---|---|
| 2012/0269425 A1* | 10/2012 | Marchesotti | G06K 9/036 382/159 |
| 2014/0176731 A1* | 6/2014 | Geiss | H04N 5/2355 348/207.1 |
| 2015/0221340 A1 | 8/2015 | Tran | |

* cited by examiner

400 ⟶

Overall Process

1. Input: Any colour or grey image -> INP

2. ANME_IMG = ANME_extraction(INP)

3. IF ANME_IMG Dimension = 3

ANME_IMG = Convert grey

END IF

4. Fect_Vect = FeatureExtraction(ANME_IMG)

5. Wt = Neural Network Prediction(Fect_Vect)

6. IF Wt<Thrs

Result = Bad

7. ELSE

Result = Good

8. END IF

Algorithm for ANME extraction

Variable: *BlockSize, NumOfRow, NumOfRow*, Row, Col, *Rincr, Cincr*, INP, *Mask* (matrix), *Block* (matrix)
*BlockSize* = 2
*NumOfRow* = Number of row in input data
*NumOfCol* = Number of col in input data
Row = Initialize to 1
Col = Initialize to 1
*Rincr* = Initialize to 1
*Cincr* = Initialize to 1
Input: Grey or Colour image
IF INP Dimension = 3 (e.g., colour image)
    *Mask* = Initialize zeros matrix for size of (*NumOfRow*/2) X (*NumOfCol*/2) in Dimension3, rounding down row and column sizes to the nearest integers
FOR Row Loop 1 to *NumOfRow*
    FOR Col Loop 1 to *NumOfCol*
        *Block* = Input [Row to Row Add *BlockSize*-1, Col to Col Add *BlockSize*-1, Dimension 1]
        *Mask* [*Rincr* to *Cincr* Dimension 1] = Sum (Block)/ *BlockSize*²
        *Block* = Input [Row to Row Add *BlockSize*-1, Col to Col Add *BlockSize*-1, Dimension 2]
        *Mask* [*Rincr* to *Cincr* Dimension 2] = Sum (Block)/ *BlockSize*²
        *Block* = Input [Row to Row Add *BlockSize*-1, Col to Col Add *BlockSize*-1, Dimension 3]
        *Mask* [*Rincr* to *Cincr* Dimension 3] = Sum (Block)/ *BlockSize*²
        Col = Col + *BlockSize*
        *Cincr* = Increment 1
        IF Col + *BlockSize*-1 > *NumOfCol*
            Col Initialize 1
            *Cincr* Initialize 1
            Exit Col Loop
        END IF
    END FOR
    Row = Row + *BlockSize*
    *Rincr* = Increment 1
    IF Row + *BlockSize*-1>*NumOfRow*
        Exit Row Loop
    END IF
END FOR

FIG. 5A

500

ELSE (e.g., grey image)
*Mask* = Initialize zeros matrix for size of (*NumOfRow*/2)X (*NumOfCol*/2), rounding down row and column sizes to the nearest integers
FOR Row Loop 1 to *NumOfRow*
    FOR Col Loop 1 to *NumOfCol*
        *Block* = Input [Row to Row Add *BlockSize*-1, Col to Col Add *BlockSize*-1]
        *Mask* [*Rincr* to *Cincr*] = Sum (Block)/ *BlockSize*\*2
        Col = Col + *BlockSize*
        *Cincr* = Increment 1
        IF Col + *BlockSize*-1 > *NumOfCol*
            Col Initialize 1
            *Cincr* Initialize 1
            Exit Col Loop
        END IF
    END FOR
    Row = Row + *BlockSize*
    *Rincr* = Increment 1
    IF Row + *BlockSize*-1>*NumOfRow*
        Exit Row Loop
    END IF
END FOR
END IF
Return Mask

FIG. 5B

- Intensity feature Of Image

Input: Grey Image
*Row* = Number of row in input data
*Col* = Number of Col in input data
*DiffH* = Initialize input grey image
*DiffV* = Initialize input grey image
*DiffH* [Start 1 to *Row*-2, All column] = Calculate Differences and Approximate Derivatives Order 1
　　of Input
*DiffV* [All row, Start 1 to *Col*-2] = Calculate Differences and Approximate Derivatives Order 2
　　　of Input
*Fmat* = Find maximum values of *DiffH* and *DiffV* matrix
*Fmat* = Calculate power of 2 in each element of *Fmat*
FM = Calculate two dimension mean estimation of *Fmat*
Return FM

- Image Contrast feature

Input: Grey Image
*Mask* = Initialize zeros matrix size of Input
*InputPad* = Make border of zero padding in Input
FOR Row Loop 1 to number of Input image row -3
    FOR Col Loop 1 to number of Input image col-3
        *Block* = Get 3*3 non overlap matrix from *InputPad*
*Cpx* = Get centre pixel of *Block*
*SubBlock* = minus *Cpx* to all element in *Block*
*Mask* = Assign *SubBlock* to same position
END FOR
END FOR
FM = Calculate two dimension mean estimation of *Mask*
Return FM

- Gradient Feature
  o Energy of Gradient

Input: Grey Image
*Row* = Number of row in input data
Col = Number of Col in input data
*DiffH* = Initialize input grey image
*DiffV* = Initialize input grey image
*DiffH* [Start 1 to *Row*-1, All column] = Calculate Differences and Approximate Derivatives Order 1 of Input
*DiffV* [All row, Start 1 to *Col*-1] = Calculate Differences and Approximate Derivatives Order 2 of Input
*Fmat* = *DiffH* each element ^2 and *DiffV* each element ^2 then add the result
FM = Calculate two dimension mean estimation of *Fmat*
Return FM o Threshold gradient

Input: Grey Image
*Row* = Number of row in input data
*Col* = Number of Col in input data
*Th* = Initialize zero
*DiffH* = Initialize input grey image
*DiffV* = Initialize input grey image
*DiffH* [Start 1 to Row-1, All column] = Calculate Differences and Approximate Derivatives Order 1 of Input
DiffV [All row, Start 1 to Col-1] = Calculate Differences and Approximate Derivatives Order 2 of Input
*AbsDiffH* = Convert absolute value of whole matrix *DiffH*
*AbsDiffV* = Convert absolute value of whole matrix *DiffV*
*M* = find maximum values in *AbsDiffH* and *AbsDiffV*
*Fmt* = find less then *Th* in *M* and replace with zero
FM = sum of all element in *Fmat* division of sum of all non-zero element in *Fmat*
Return FM o Squared gradient

Input: Grey Image
*Diff* = Calculate Differences and Approximate Derivatives Order 2 of Input
*Fmat* = Calculate power of 2 in each element of *Diff*
FM = Calculate two dimension mean estimation of *Fmat*
Return FM

- Laplacian Feature
  - Energy of Laplacian

Input: Grey Image
*Lap* = Initialize Laplacian filter values 3*3 matrix with [0.1667 0.6667 0.1667; 0.6667 -3.3333 0.6667; 0.1667 0.6667 0.1667]
*Fmat* = Apply Laplacian filter *Lap* using convolution to Input
FM = Calculate power of 2 in each element of *Fmat* and Calculate two dimension mean estimation
Return FM

- Modified Laplacian

Input: Grey Image
*Lap* = Initialize Laplacian filter values 1*3 matrix with [-1 2 -1]
*FmatH* = Apply Laplacian filter *Lap* using convolution to Input
*FmatV* = Apply Laplacian filter *Lap* transpose using convolution to Input
*Fmat* = Convert absolute value of whole matrix *FmatH* & *FmatV* and sum of two matrix (*FmatH* & *FmatV*)
FM = Calculate two dimension mean estimation of *Fmat*
Return FM

- Diagonal Laplacian

Input: Grey Image
*Lap1* = Initialize Laplacian filter values 1*3 matrix with [-1 2 -1]
*Lap2* = Initialize Laplacian filter values 3*3 matrix with [0 0 -1; 0 2 0;-1 0 0]/ square root (2)
*Lap3* = Initialize Laplacian filter values 3*3 matrix with [-1 0 0; 0 2 0; 0 0 -1]/ square root (2)
*Lap4* = Initialize Laplacian filter values 3*3 transpose of *Lap3*
*Fmat1* = Apply Laplacian filter *Lap1* using convolution to Input
*Fmat2* = Apply Laplacian filter *Lap2* using convolution to Input
*Fmat3* = Apply Laplacian filter *Lap3* using convolution to Input
*Fmat4* = Apply Laplacian filter *Lap4* using convolution to Input
*Fmat* = Convert absolute value of whole matrix *Fmat* 1to4 and sum of all
FM = Calculate two dimension mean estimation of *Fmat*
Return FM

- Correlation Feature

Input: Grey Image
*I1* = Initialize Input
*I2* = Initialize Input
*I1* [1 to row end-1, all column] = assign the matrix of Input [2 to row end, all column]
*I2* [1 to row end-2, all column] = assign the matrix of Input [3 to row end, all column]
*Seb* = minus of *I1* and *I2*
*Fmat* = element wise multiplication of Input and *Seb*
FM = Calculate two dimension mean estimation of *Fmat*
Return FM

- Variance Feature

Input: Grey Image
Cof = Apply wavelet decomposition using Daubechies in level 1 to Input, and get coefficients of horizontal, Vertical, diagonal and approximation
Hc = Extract horizontal coefficients from Cof
Vc = Extract vertical coefficients from Cof
Dc = Extract diagonal coefficients from Cof
SHc = Calculate matrix standard deviation of Hc and get power of 2
SVc = Calculate matrix standard deviation of Vc
SDc = Calculate matrix standard deviation of Dc
FM = sum of all and take standard deviation of horizontal, vertical, diagonal (SHc, SVc, SDc)
Return FM

- Blur Feature

Input: Grey Image
*Row* = Number of row in input data
*Col* = Number of Col in input data
*Hfv* = Horizontal filter values [0.1111  0.1111  0.1111  0.1111  0.1111  0.1111  0.1111  0.1111  0.1111]
*Vfv* = Vertical filter values transpose of *Hfv*
*Bh* = Blur the Input using *Hfv* filter values
*Bv* = Blur the Input using *Vfv* filter values
*IVh* = Calculate variation of Input in horizontal direction
*IVv* = Calculate variation of Input in vertical direction
*BVh* = Calculate variation of Blur image (*Bh*) in horizontal direction
*BVv* = Calculate variation of Blur image (*Bv*) in vertical direction
*DVh* = Calculate difference between two horizontal variation of Input (*IVh*) and Blur (*BVh*)
*DVv* = Calculate difference between two vertical variation of Input (*IVv*) and Blur (*BVv*)
*Vv* = find and replace all negative values to zero in *DVh*
*Hv* = find and replace all negative values to zero in *DVv*
*SDh* = Sum of all element in variation data of Input (*IVh* [2 to Row-1, 2 to Col-1])
*SDv* = Sum of all element in variation data of Input (*IVv* [2 to Row-1, 2 to Col-1])
*SVh* = Sum of all element in variation data of Blur (*Vh* [2 to Row-1, 2 to Col-1])
*SVv* = Sum of all element in variation data of Blur (*Vv* [2 to Row-1, 2 to Col-1])
BlrD = (*SDh- SVh*)/ *SDh*
BlrV = (*SDv- SVv*)/ *SDv*
FM = find max value of [BlrD BlrV]
Return FM

FIG. 12

IMAGE QUALITY ASSESSMENT USING ADAPTIVE NON-OVERLAPPING MEAN ESTIMATION

FIELD OF THE DISCLOSURE

This disclosure relates generally to assessing image quality and, more particularly, to image quality assessment using adaptive non-overlapping mean estimation.

BACKGROUND

Manufacturers are interested in attracting customers to their products. To do so, manufacturers spend considerable money and effort to invent new marketing solutions (such as identifying different locations to place products in stores, creating new brands and/or logos to draw attention, creating promotions, etc.) to reach customers. To assess marketing effectiveness, some manufactures perform auditing (or retain auditing companies to perform auditing) to evaluate the way their products are being sold (e.g., displayed) in stores. Such auditing techniques can involve having an auditor physically travel to a store to be audited, capture images of various product displays, and then send the captured images back to a central facility for auditing.

BRIEF DESCRIPTION OF THE DRAWINGS

FIGS. 4-12 illustrate example pseudocode that may be used to implement the example image assessor of FIG. 1 and/or either or both of the example programs illustrated in FIGS. 2 and/or 3.

The figures are not to scale. Wherever possible, the same reference numbers will be used throughout the drawing(s) and accompanying written description to refer to the same or like parts, elements, etc.

DETAILED DESCRIPTION

Figure 1:
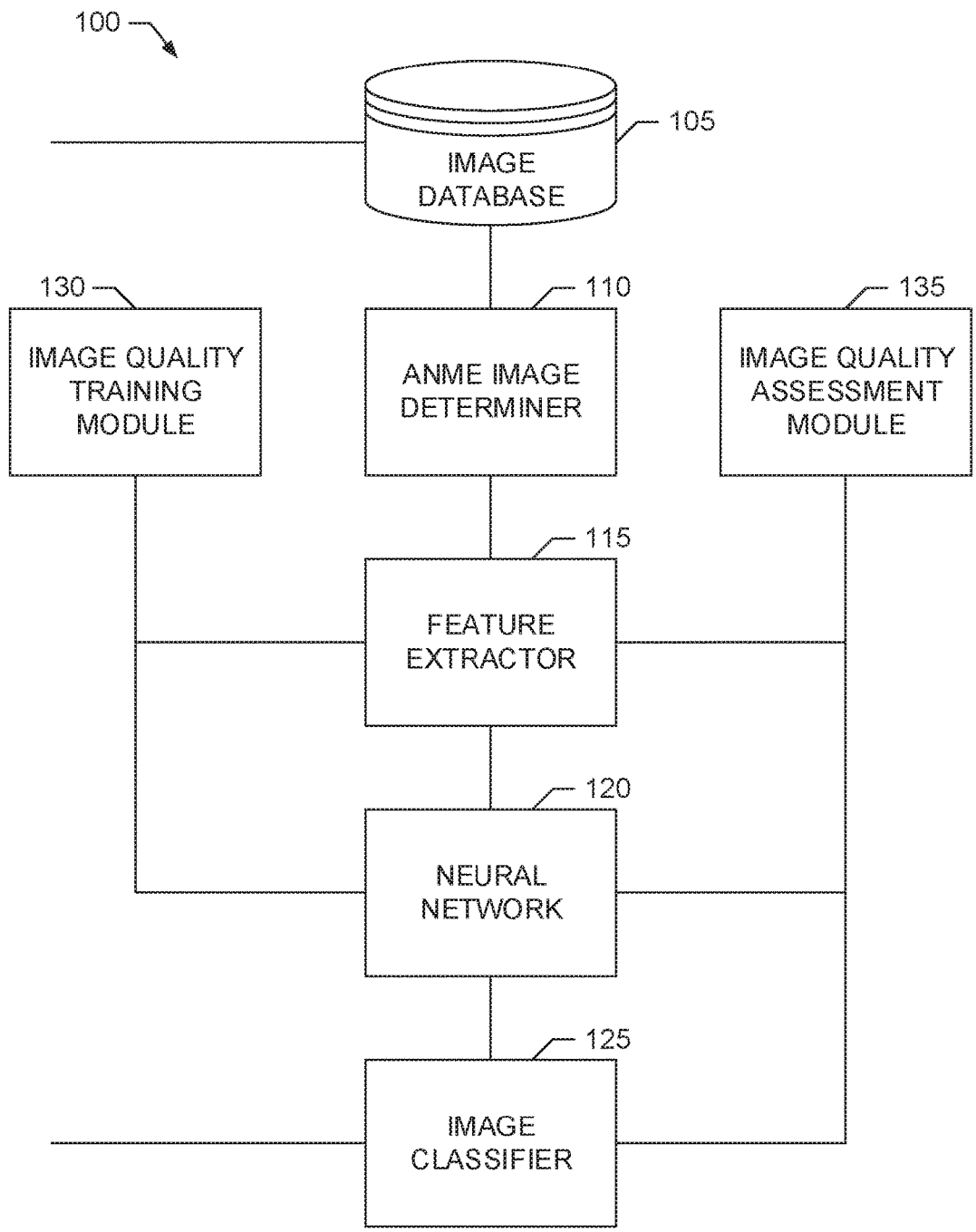
FIG. 1 is a block diagram of an example image assessor implemented in accordance with the teachings of this disclosure.

Example methods, apparatus, systems and articles of manufacture (e.g., physical storage media) to assess image quality using adaptive non-overlapping mean estimation are disclosed. Example image quality assessment methods disclosed herein include replacing respective blocks of pixels of a first image (e.g., an input image) with mean values (e.g., averages) of the respective blocks of pixels to determine a second image (e.g., an adaptive non-overlapping mean estimation image) having a smaller size than the first image. Disclosed example image quality assessment methods also include determining a vector of features for the second image. Disclosed example image quality assessment methods further include applying the vector of features to a neural network, and classifying a quality (e.g., good or bad) of the first image based on an output of the neural network. Unlike prior image assessment techniques, such disclosed example image quality assessment methods are able to classify the quality of an input image without having access to a reference version of the input image having known quality.

In some disclosed example methods, the replacing of the respective blocks of pixels of the first image with mean values of the respective blocks of pixels to determine the second image includes segmenting the first image into the respective blocks of pixels, with the respective blocks of pixels having a first number of pixels in a horizontal direction and a second number of pixels in a vertical direction. Then, for a first one of the respective blocks of pixels, such disclosed example methods include averaging values of the pixels in the first one of the respective blocks of pixels to determine a first mean value corresponding to the first one of the respective blocks of pixels, and setting a first pixel of the second image to be the first mean value, the first pixel at a first position in the second image that is to represent the first one of the respective blocks of pixels of the first image. For example, the first number of pixels can be two pixels, the second number of pixels can be two pixels, and the respective blocks of pixels of the first image can each include four pixels, which results in the second image being one-fourth the size of the first image.

Additionally or alternatively, some disclosed example methods include converting the second image to a grayscale image before determining the vector of features for the second image.

In some disclosed example methods, the classifying of the quality of the first image includes performing a single classification of the quality of the first image by: (1) classifying the first image as acceptable for an image auditing application when the output of the neural network satisfies a threshold; and (2) classifying the first image as unacceptable for the image auditing application when the output of the neural network does not satisfy the threshold.

In some disclosed example methods, the classifying of the quality of the first image includes comparing multiple outputs of the neural network to multiple thresholds to perform multiple classifications of the quality of the first image.

These and other example methods, apparatus, systems and articles of manufacture (e.g., physical storage media) to assess image quality using adaptive non-overlapping mean estimation are disclosed in further detail below.

As noted above, manufacturers are interested in attracting customers to their products. To do so, manufacturers spend considerable money and effort to invent new marketing solutions (such as identifying different locations to place products in stores, creating new brands and/or logos to draw attention, creating promotions, etc.) to reach customers. The effectiveness of such solutions is difficult to measure. For example, feedback may be limited to the amount of products that have been sold over a given period of time. Thus, having reliable information concerning the effectiveness of these marketing solutions is important to manufactures, as well the auditing companies who provide this information to the manufacturers.

To assess marketing effectiveness, some manufactures perform (or retain auditing companies to perform) auditing to evaluate the way their products are being sold (e.g., displayed) in stores. Such auditing yields a set of key performance indicators (KPIs) that allows manufacturers to determine whether their marketing solutions are being implemented properly, and/or whether their marketing solutions are accomplishing their desired goals. However, such auditing techniques typically involve having an auditor physically travel to a store to be audited, capture images of the different product displays, and then send the captured images back to a central facility for auditing.

Image quality assessment is an important task in such auditing applications. For example, accuracy is an important factor when auditing images. Some auditing companies utilize employees to manually review the reported images for quality (e.g., blur, bad lighting, etc.) before the images are input to an image auditing system, which can improve auditing accuracy. However, manual image quality assessment can require substantial expenditure of resources just to assess the quality of received images, which does not scale up as business needs grow. For example, a global image auditing company could process 120 million or more images a year taken from several countries. Manually checking each image for quality is impractical. Moreover, by the time an employee at the central facility determines an image has poor quality, the auditor is likely to have left the store corresponding to that image, which may require the auditor to waste time and money to return to the store to retake the image.

Disclosed example methods, apparatus, systems and articles of manufacture (e.g., physical storage media) improve on the accuracy of existing image auditing system by assessing image quality using adaptive non-overlapping mean estimation (ANME). Disclosed example ANME image quality assessment techniques extract the detailed pixel information of the input image to determine a detailed image, which is used to enhance the accuracy of the assessment. For example, the input image may be an image taken of a product shelf of a retail establishment. Furthermore, after the disclosed example ANME image quality assessment techniques convert the input image into a detailed image, such disclosed techniques extract a vector of features, including, but not limited to, contrast, gradient, edge features, correlation, variance, Laplacian features, direction of gradient, etc., from the detailed image. Disclosed example ANME image quality assessment techniques then apply this feature vector for training and using a back propagation neural network (and/or other machine learning algorithm) to classify the quality of the image. In some examples, the ANME image quality assessment techniques disclosed herein perform a binary classification in which the input image is classified as either good or bad. In some examples, the ANME image quality assessment techniques disclosed herein additionally or alternatively perform a more detailed classification, such as classifying an input image as blurry or crisp, too bright or too dark, etc. In some examples, the resulting classification of image quality determined by the example ANME image quality assessment techniques disclosed herein can be provided to a client (e.g., manufacturer) and/or auditor (e.g., while the auditor is still in the store being audited) as an objective measure of image quality. This is unlike prior manual-based techniques, in which classification is subjective and prone to inaccuracies, and in which classification may take too long to be provided to the auditor while the auditor is still in the store corresponding to the image.

Turning to the figures, a block diagram of an example image assessor system 100 (also referred to herein as the image assessor 100) implemented in accordance with the teachings of this disclosure is illustrated in FIG. 1. The example image assessor 100 includes an example image database 105 to receive and store images whose quality is to be assessed. The images stored in the example image database 105 may be grayscale (e.g., one-dimensional) images and/or color (e.g., three-dimensional) images. In some example, images are captured via one or more cameras and/or other imaging devices, and are received by the image database 105 via a network (e.g., such as the Internet). In some example, the images are captured by one or more auditors performing shelf auditing in one or more retail establishments. The example image database 105 may be implemented by any type(s) and/or number(s) of memories, storage elements, etc., such as the example mass storage device 1328 and/or the example volatile memory 1314 of the example processor platform 1300 of FIG. 13, which is described in further detail below.

The example image assessor 100 of FIG. 1 also includes an example ANME image determiner 110 to retrieve an input image (e.g., a first image) from the image database 105 (and/or from any other source) and determine an ANME image (e.g., a second image, also referred to herein as a detailed image) from the input image. In the illustrated example, the ANME image determiner 110 determines the ANME image from the input image by replacing respective blocks (also referred to herein as sub-matrices) of pixels of the input image with averages of the respective blocks of pixels. For example, the ANME image determiner 110 may segment the input image into 2×2 blocks (sub-matrices) of pixels, which are blocks of pixels dimensioned to have 2 pixels in the vertical direction (e.g., 2 rows of pixels) and 2 pixels in the horizontal direction (e.g., 2 columns of pixels). In some examples, the input image is segmented into non-overlapping (e.g., adjacent) the 2×2 blocks (sub-matrices) of pixels. Then, for each block (sub-matrix) of 2×2 pixels, the ANME image determiner 110 determines the mean value (e.g., average) of the 4 pixels included in the block (sub-matrix). The ANME image determiner 110 then sets the value of a pixel of the ANME image representing this block (sub-matrix) of 2×2 pixels to be the mean value of the 4 pixels included in that block (sub-matrix). Thus, the resulting ANME image in such an example will be one-fourth the size of the input image or, stated another way, the horizontal and vertical dimensions of the ANME image will be half those of the input image.

Figure 14:
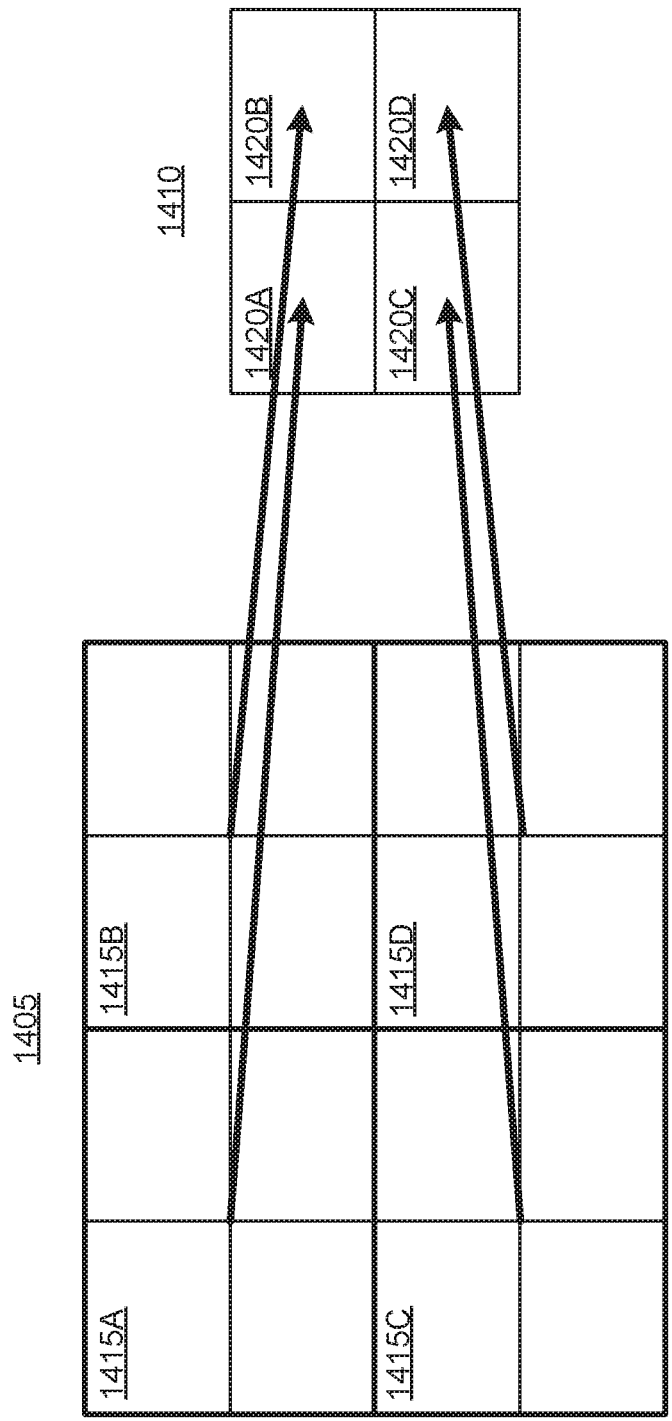
FIG. 14 illustrates an example operation of the example image assessor of FIG. 1 to form an example adaptive non-overlapping mean estimation image from an example input image in accordance with the teachings of this disclosure.

For example, FIG. 14 illustrates an example operation of the ANME image determiner 110 to process an example input image 1405 to determine a corresponding example ANNIE image 1410. In the example of FIG. 14, the ANME image determiner 110 segments the input image 1405 into non-overlapping 2×2 blocks (sub-matrices) of pixels 1415A, 1415B, 1415C and 1415D. The ANME image determiner 110 determines the mean value (e.g., average) of the 4 pixels included in the block (sub-matrix) 1415A of the input image 1405, and then sets the value of an example pixel 1420A of the ANME image 1410 be the mean value of the 4 pixels included in the block (sub-matrix) 1415A of the input image 1405. Similarly, the ANNIE image determiner 110 determines the mean value (e.g., average) of the 4 pixels included in the block (sub-matrix) 1415B of the input image 1405, and then sets the value of an example pixel 1420B of the ANME image 1410 be the mean value of the 4 pixels included in the block (sub-matrix) 1415B of the input image 1405. Similarly, the ANME image determiner 110 determines the mean value (e.g., average) of the 4 pixels included in the block (sub-matrix) 1415C of the input image 1405, and then sets the value of an example pixel 1420C of the ANNIE image 1410 be the mean value of the 4 pixels included in the block (sub-matrix) 1415C of the input image 1405. Similarly, the ANNIE image determiner 110 determines the mean value (e.g., average) of the 4 pixels included in the block (sub-matrix) 1415D of the input image 1405, and then sets the value of an example pixel 1420D of the ANNIE image 1410 be the mean value of the 4 pixels included in the block (sub-matrix) 1415D of the input image 1405.

More generally, in some examples, the ANME image determiner 110 of FIG. 1 may segment the input image into M×N blocks (sub-matrices) of pixels, which are blocks of pixels dimensioned to have M pixels in the vertical direction (e.g., M rows of pixels) and N pixels in the horizontal direction (e.g., N columns of pixels), where M and N are integer values. The values of M and N may be preconfigured, specified via a user input, etc. In some such examples, the input image is segmented into non-overlapping (e.g., adjacent) M×N blocks (sub-matrices) of pixels. Then, for each block (sub-matrix) of M×N pixels, the ANME image determiner 110 determines the mean value (e.g., average) of the (MN) pixels included in the block (sub-matrix). The ANME image determiner 110 then sets the value of a pixel of the ANME image representing this block (sub-matrix) of M×N pixels to be the mean value of the (MN) pixels included in that block (sub-matrix). Thus, the resulting ANME image in such an example will be 1/(MN) the size of the input image or, stated another way, the vertical dimension of the ANME image will be 1/M the size of the input image, and the horizontal dimension of the ANME image will be 1/N the size of the input image. Example pseudocode 500 that may be used to implement the ANME image determiner 110 is illustrated in FIGS. 5A-B, which are described in further detail below.

The example image assessor 100 of FIG. 1 further includes an example feature extractor 115 to extract features from an ANME image determined by the ANME image determiner 110. In the illustrated example, feature extractor 115 extracts one or more of the following features from an ANME image: intensity, contrast, gradient, edge features, correlation, variance, Laplacian features, direction of gradient, blur, etc. Example pseudocode 600, 700, 800, 900, 1000, 1100 and 1200 that may be used to implement the feature extractor 115 and to thereby extract one or more of the foregoing features is illustrated in FIGS. 6-12, which are described in further detail below.

The example image assessor 100 of FIG. 1 includes an example neural network 120 to process a vector of features output by the feature extractor 115 to determine a resulting output value, also referred to as an output weight, to be used to classify the input image retrieved from the image database 105. The neural network 120 can be implemented by any type(s) and/or number(s) of neural networks, machine learning systems, etc., such as a back propagation neural network.

The example image assessor 100 of FIG. 1 includes an example image classifier 125 to classify a quality of the input image based on the output weight determined by the neural network 120. In some examples, the image classifier 125 compares the output weight of the neural network 120 to a threshold to classify the input image. In some examples, the image classifier 125 classifies the input image as either good or bad based on the comparison of the output weight of the neural network 120 to the threshold. For example, the image classifier 125 may classify the first image as good (e.g., acceptable for an image auditing application) when the output of the neural network satisfies a threshold, and classify the first image as bad (e.g., unacceptable for the image auditing application) when the output of the neural network does not satisfy the threshold. In some examples, the image classifier 125 additionally or alternatively performs a more detailed classification of the image based on one or more output values/weights determined by the neural network 120, and/or a combination of the output values/weights determined by the neural network 120 and values of the features determined by the feature extractor 115. For example, the image classifier 125 may compare different neural network output weights and/or feature values to different thresholds to determine whether the input image is fuzzy or clear, too light or too dark, etc.

Figure 2:
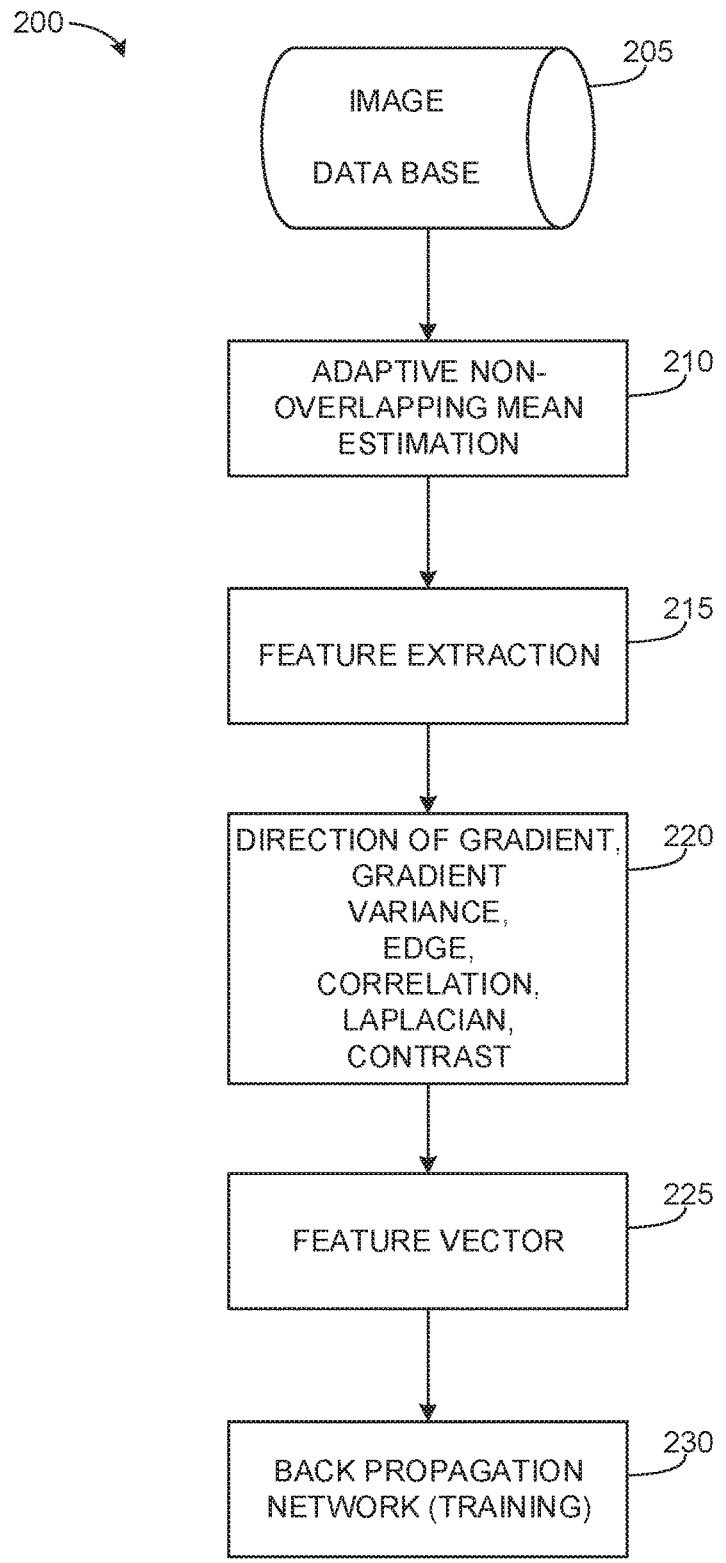
FIG. 2 is a flowchart representative of an example program that may be executed to train the example image assessor of FIG. 1.

The example image assessor 100 of FIG. 1 includes an example image quality training module 130 to train the example neural network 120 to be able to process an input feature vector to determine output value(s)/weight(s) that can classify the quality of an input image accurately. In some examples, the neural network 120 includes layers of nodes having weights that may be adapted through a training process. In some such examples, the image quality training module 130 uses a subset of the images stored in the image database 105 to train the weights of the neural network 120. An example program 200 that may be used to implement the example image quality training module 130 is illustrated in FIG. 2, which is described in further detail below.

Figure 3:
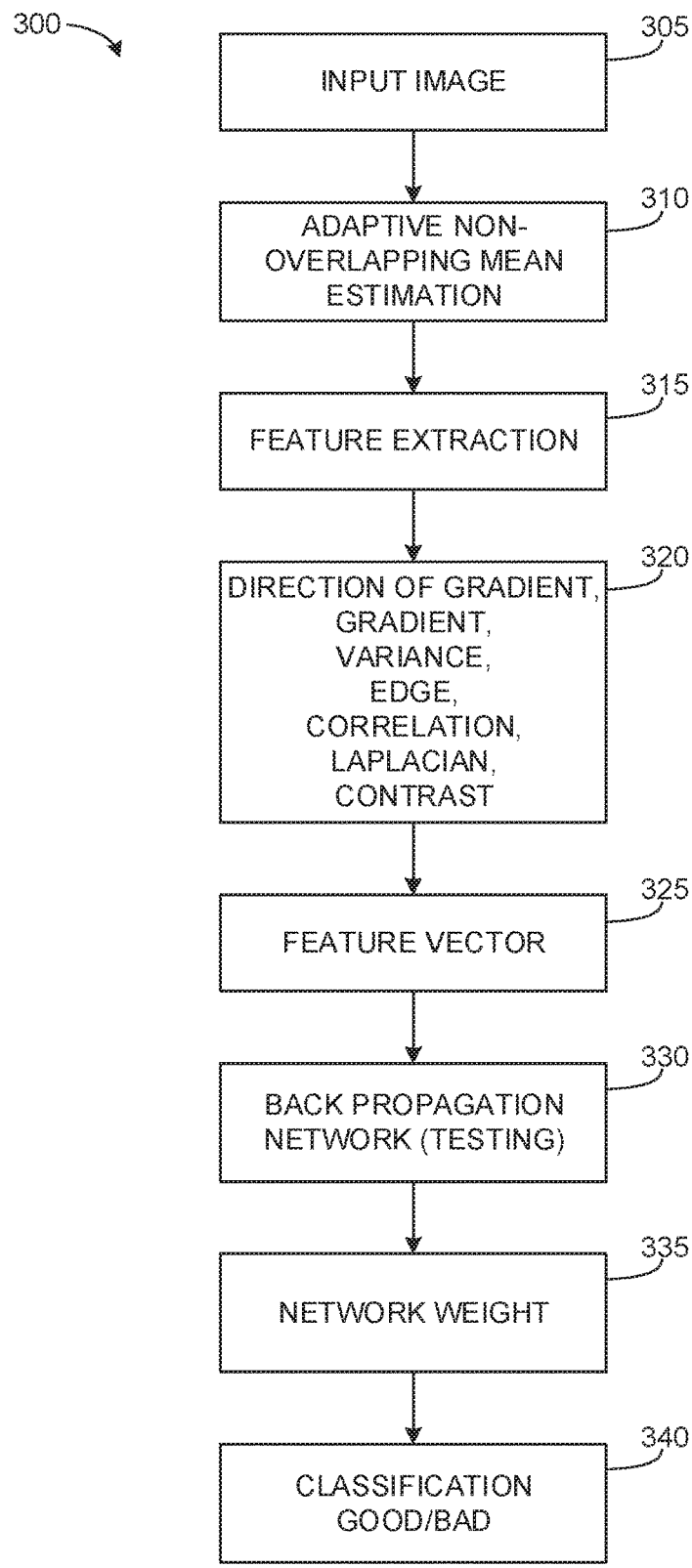
FIG. 3 is a flowchart representative of an example program that may be executed by the example image assessor of FIG. 1 to perform image quality assessment.

The example image assessor 100 of FIG. 1 also includes an example image quality assessment module 135 to operate the neural network to classify input images. In some examples, the image quality assessment module 135 is invoked after the neural network 120 has been trained by the example image quality training module 130. An example program 300 that may be used to implement the example image quality assessment module 135 is illustrated in FIG. 3, which is described in further detail below.

While an example manner of implementing the example image assessor 100 is illustrated in FIG. 1, one or more of the elements, processes and/or devices illustrated in FIG. 1 may be combined, divided, re-arranged, omitted, eliminated and/or implemented in any other way. Further, the example image database 105, the example ANME image determiner 110, the example feature extractor 115, the example neural network 120, the example image classifier 125, the example image quality training module 130, the example image quality assessment module 135 and/or, more generally, the example image assessor 100 of FIG. 1 may be implemented by hardware, software, firmware and/or any combination of hardware, software and/or firmware. Thus, for example, any of the example image database 105, the example ANME image determiner 110, the example feature extractor 115, the example neural network 120, the example image classifier 125, the example image quality training module 130, the example image quality assessment module 135 and/or, more generally, the example image assessor 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image assessor 100, the example image database 105, the example ANME image determiner 110, the example feature extractor 115, the example neural network 120, the example image classifier 125, the example image quality training module 130 and/or the example image quality assessment module 135 is/are hereby expressly defined to include a tangible computer readable storage device or storage disk such as a memory, a digital versatile disk (DVD), a compact disk (CD), a Blu-ray disk, etc. storing the software and/or firmware. Further still, the example image assessor 100 may include one or more elements, processes and/or devices in addition to, or instead of, those illustrated in FIG. 1, and/or may include more than one of any or all of the illustrated elements, processes and devices.

Flowcharts and pseudocode representative of example machine readable instructions for implementing the example image assessor 100, the example image database 105, the example ANME image determiner 110, the example feature extractor 115, the example neural network 120, the example image classifier 125, the example image quality training module 130 and/or the example image quality assessment module 135 are shown in FIGS. 2-12. In these examples, the machine readable instructions comprise one or more programs for execution by a processor, such as the processor 1312 shown in the example processor platform 1300 discussed below in connection with FIG. 13. The one or more programs, or portion(s) thereof, may be embodied in software stored on a tangible computer readable storage medium such as a CD-ROM, a floppy disk, a hard drive, a digital versatile disk (DVD), a Blu-ray Disk™ or a memory associated with the processor 1312, but the entire program or programs and/or portions thereof could alternatively be executed by a device other than the processor 1312 and/or embodied in firmware or dedicated hardware (e.g., implemented by an ASIC, a PLD, an FPLD, discrete logic, etc.). Further, although the example program(s) is(are) described with reference to the flowcharts and pseudocode illustrated in FIGS. 2-12, many other methods of implementing the example image assessor 100, the example image database 105, the example ANME image determiner 110, the example feature extractor 115, the example neural network 120, the example image classifier 125, the example image quality training module 130 and/or the example image quality assessment module 135 may alternatively be used. For example, with reference to the flowcharts and pseudocode illustrated in FIGS. 2-12, the order of execution of the blocks and/or instructions may be changed, and/or some of the blocks/instructions described may be changed, eliminated, combined and/or subdivided into multiple blocks/instructions.

As mentioned above, the example processes of FIGS. 2-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 2-12 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 200 that may be executed to implement the example image quality training module 130 of the example image assessor 100 of FIG. 1 is illustrated in FIG. 2. With reference to the preceding figures and associated written descriptions, the example program 200 of FIG. 2 begins execution at block 205 at which the image quality training module 130 selects a subset of the images from the image database 105 to be used as training images. At block 210, the image quality training module 130 invokes the example ANME image determiner 110 of the image assessor 100 to determine, as described above, ANME images corresponding to the images selected at block 205. At block 215, the image quality training module 130 invokes the example feature extractor 115 of the image assessor 100 to determine, as described above, features for the ANME images determined at block 210. Examples of the features determined at block 215 are listed in block 220. At block 225, the feature extractor 115 outputs respective feature vectors, as described above, for each of the ANME images. At block 230, the image quality training module 130 applies the respective feature vectors to the example neural network 120 of the image assessor 100 to train the neural network 120. In some examples, at block 230, the image quality training module 130 uses human feedback to inform the neural network 120 of the respective image quality or qualities (e.g., good, bad, blurry, clear, light, dark, etc.) associated with each input feature vectors. In some such examples, the neural network 120 uses such feedback to adjust its weights to discriminate features associated with the different image quality classifications. After the neural network 120 is trained, execution of the example program 200 ends.

An example program 300 that may be executed to implement the example image quality assessment module 135 of the example image assessor 100 of FIG. 1 is illustrated in FIG. 3. With reference to the preceding figures and associated written descriptions, the example program 300 of FIG. 3 begins execution at block 305 at which the image quality assessment module 135 selects an input image from the image database 105 to be assessed. At block 310, the image quality assessment module 135 invokes the example ANME image determiner 110 of the image assessor 100 to determine, as described above, an ANME image corresponding to the input image obtained at block 305. At block 315, the image quality assessment module 135 invokes the example feature extractor 115 of the image assessor 100 to determine, as described above, features for the ANME image determined at block 310. Examples of the features determined at block 315 are listed in block 320. At block 325, the feature extractor 115 outputs a feature vector, as described above, for the ANME image. At block 330, the image quality assessment module 135 applies the feature vector to the example neural network 120 of the image assessor 100. At block 335, the neural network 120 outputs one or more values/weights determined from the feature vector. At block 340, the image quality assessment module 135 invokes the example image classifier 125 of the image assessor 100 to classify the input image based on the values/weights output by the neural network 120, as described above. Execution of the example program 300 then ends.

Example pseudocode 400 that may be used to implement the example image assessor 100 of FIG. 1 and/or the example programs 200 and/or 300 of FIGS. 2-3 is illustrated in FIG. 4. At line 1 of the pseudocode 400, the image assessor 100 obtains (e.g., from the image database 105) an input image to be assessed. At line 2 of the pseudocode 400, the example ANME image determiner 110 of the image assessor 100 determines, as described above, an ANME image for the input image. An example function ANME_extraction( ) that may be implemented by the ANME image determiner 110 to perform the processing at line 1 is illustrated in FIGS. 5A-B. At line 3 of the pseudocode 400, the image assessor 100 converts the ANME image to a grayscale image, if appropriate. At line 4 of the pseudocode 400, the example feature extractor 115 of the image assessor 100 determines and outputs a feature vector, as described above, for the ANME image. Several example component functions that may be called by the FeatureExtraction( ) function and used to implement the feature extractor 115 to perform the processing at line 4 are illustrated in FIGS. 6-12. At line 5 of the pseudocode 400, the example neural network 120 of the image assessor 100 processes the feature vector to determine an output weight, as described above. At lines 6-8 of the pseudocode 400, the example image classifier 125 of the image assessor 100 compares the output weight to a threshold to classify the input image as either good or bad. Execution of the example pseudocode 400 then ends.

FIGS. 5A-B collectively illustrate example pseudocode 500 to perform ANME image determination. The example pseudocode 500 may be used to implement the example ANME image determiner 110 of FIG. 1, the example processing at block 210 of FIG. 2, the example processing at block 310 of FIG. 3 and/or the example processing at line 2 of FIG. 4. The example pseudocode 500 of FIGS. 5A-B determines ANME images for both color input images and grayscale input images. For a color input image, the example pseudocode 500 determines respective ANME images for the three (3) different color dimensions of the input image using the techniques described above. For a grayscale input image, the example pseudocode 500 determines a single ANME image for the single grayscale dimension of the input image.

FIG. 6 illustrates example pseudocode 600 to determine an example intensity feature for an image, such as an ANME image disclosed above. The example pseudocode 600 may be used to implement the example feature extractor 115 of FIG. 1, the example processing at block 215 of FIG. 2, the example processing at block 315 of FIG. 3 and/or the example processing at line 4 of FIG. 4. The example pseudocode 600 of FIG. 6 returns an image intensity value for the input ANME image that is based on largest values of the horizontal and vertical derivatives (e.g., $1^{st}$ order and $2^{nd}$ order) of the ANME image, as shown.

FIG. 7 illustrates example pseudocode 700 to determine an example contrast feature for an image, such as an ANME image disclosed above. The example pseudocode 700 may be used to implement the example feature extractor 115 of FIG. 1, the example processing at block 215 of FIG. 2, the example processing at block 315 of FIG. 3 and/or the example processing at line 4 of FIG. 4. The example pseudocode 700 of FIG. 7 returns an image contrast value determined by segmenting the input ANME image into blocks, removing the center pixel of each block, and averaging the result.

FIG. 8 illustrates example pseudocode 800 to determine example gradient features for an image, such as an ANME image disclosed above. The example pseudocode 800 may be used to implement the example feature extractor 115 of FIG. 1, the example processing at block 215 of FIG. 2, the example processing at block 315 of FIG. 3 and/or the example processing at line 4 of FIG. 4. In the illustrated example of FIG. 8, the example pseudocode 800 returns an overall energy of the gradient determined for each element of the input ANME image. The example pseudocode 800 also returns a threshold gradient value that corresponds to a number of elements of the input ANME image that are associated with gradients satisfying a threshold. The example pseudocode 800 further returns a squared gradient value that corresponds to an overall average of the squares of the gradients determined for each element in the input ANME image, FIG. 9 illustrates example pseudocode 900 to determine example Laplacian features for an image, such as an ANME image disclosed above. The example pseudocode 900 may be used to implement the example feature extractor 115 of FIG. 1, the example processing at block 215 of FIG. 2, the example processing at block 315 of FIG. 3 and/or the example processing at line 4 of FIG. 4. In the illustrated example of FIG. 9, the example pseudocode 900 returns a Laplacian energy value that corresponds to an average energy of the input ANME image after applying a 2-dimensional Laplacian filter to the ANME image. The example pseudocode 900 also returns a modified Laplacian value that corresponds to an average magnitude of the input ANME image after applying a 1-dimensional Laplacian filter to the ANME image in the horizontal and vertical directions. The example pseudocode 900 further returns a diagonal Laplacian value that corresponds to an average magnitude of images formed applying a 1-dimensional Laplacian filter to the ANME image in the horizontal and vertical directions, and by applying 2-dimensional diagonal Laplacian filters to the ANME image.

FIG. 10 illustrates example pseudocode 1000 to determine an example correlation feature for an image, such as an ANME image disclosed above. The example pseudocode 1000 may be used to implement the example feature extractor 115 of FIG. 1, the example processing at block 215 of FIG. 2, the example processing at block 315 of FIG. 3 and/or the example processing at line 4 of FIG. 4. The example pseudocode 1000 of FIG. 10 returns a correlation value representing how much adjacent pixels of the input ANME image are correlated.

FIG. 11 illustrates example pseudocode 1100 to determine an example variance feature for an image, such as an ANME image disclosed above. The example pseudocode 1100 may be used to implement the example feature extractor 115 of FIG. 1, the example processing at block 215 of FIG. 2, the example processing at block 315 of FIG. 3 and/or the example processing at line 4 of FIG. 4. The example pseudocode 1100 of FIG. 11 returns a variance value corresponding to the variance of a wavelet decomposition of the input ANME image.

FIG. 12 illustrates example pseudocode 1200 to determine an example blur feature for an image, such as an ANME image disclosed above. The example pseudocode 1200 may be used to implement the example feature extractor 115 of FIG. 1, the example processing at block 215 of FIG. 2, the example processing at block 315 of FIG. 3 and/or the example processing at line 4 of FIG. 4. The example pseudocode 1200 of FIG. 12 returns an image blur value representing how much the input ANME image differs from a version of the ANME image that is blurred with a blurring filter applied in the horizontal and vertical directions of the image.

Figure 13:
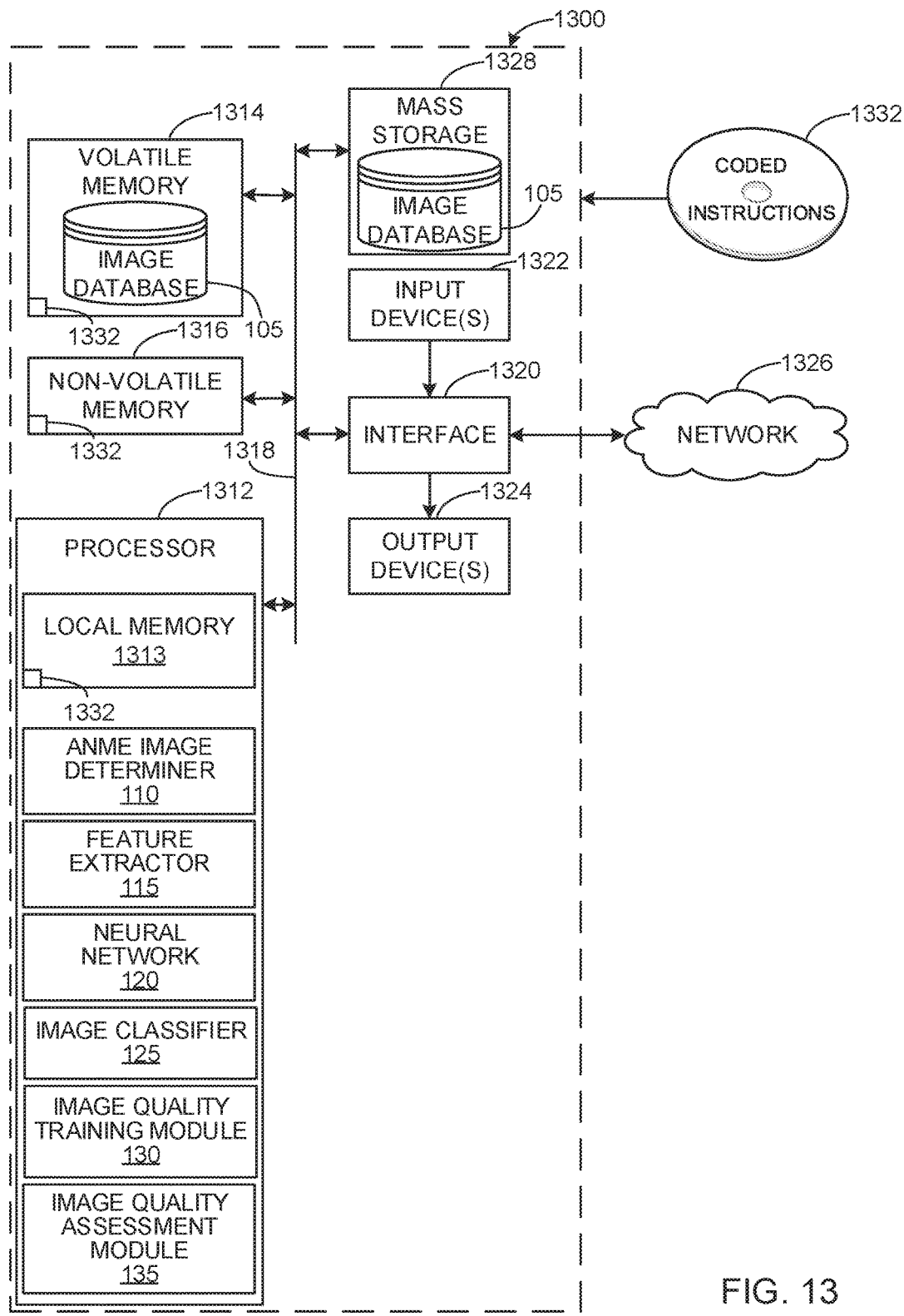
FIG. 13 is a block diagram of an example processor platform structured to execute the example machine readable instructions corresponding to the example programs of one or more of FIGS. 2-12 to implement the example image assessor of FIG. 1.

FIG. 13 is a block diagram of an example processor platform 1300 structured to execute the instructions of one or more of FIGS. 2-12 to implement the example image assessor 100 of FIG. 1. The processor platform 1300 can be, for example, a server, a personal computer, a mobile device (e.g., a cell phone, a smart phone, a tablet such as an iPad™), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In some examples, the example processor 1312 is configured via example instructions 1332, which include the example instructions of one or more of FIGS. 2-12, to implement the example ANME image determiner 110, the example feature extractor 115, the example neural network 120, the example image classifier 125, the example image quality training module 130, the example image quality assessment module 135 and/or, more generally, the example image assessor 100 of FIG. 1.

The processor 1312 of the illustrated example includes a local memory 1313 (e.g., a cache). The processor 1312 of the illustrated example is in communication with a main memory including a volatile memory 1314 and a non-volatile memory 1316 via a link 1318. The link 1318 may be implemented by a bus, one or more point-to-point connections, etc., or a combination thereof. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID (redundant array of independent disks) systems, and digital versatile disk (DVD) drives. In some examples, the example mass storage device(s) 1328 implement the example image database 105. Additionally or alternatively, in some examples, the example volatile memory 1314 implements the example image database 105.

Coded instructions 1332 corresponding to the instructions of one or more of FIGS. 2-12 may be stored in the mass storage device 1328, in the volatile memory 1314, in the non-volatile memory 1316, in the local memory 1313 and/or on a removable tangible computer readable storage medium, such as a CD or DVD 1336.

It is noted that this patent claims priority from Indian Patent Application Serial Number 4238/DEL/2015, which was filed on Dec. 22, 2015, and is hereby incorporated by reference in its entirety Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform image quality assessment, the apparatus comprising:
    a training module to train a neural network, based on a set of training images, to classify quality of a first image;
    an image determiner to replace respective blocks of pixels of the first image with mean values of the respective blocks of pixels to determine a second image having a smaller size than the first image;
    a feature extractor to determine a vector of features including a blur feature value for the second image and to apply the vector of features to the neural network after the neural network has been trained, the feature extractor to determine the blur feature value based on an amount the second image differs from a version of the second image filtered with a blurring filter in horizontal and vertical directions of the second image; and
    an image classifier to classify a quality of the first image based on an output of the neural network, the training module, the image determiner, the feature extractor, and the image classifier implemented by hardware circuitry or at least one processor.

2. The apparatus of claim 1, wherein the respective blocks of pixels of the first image form adjacent blocks of pixels that are non-overlapping.

3. The apparatus of claim 1, wherein to determine the second image, the image determiner is further to:

segment the first image into the respective blocks of pixels, the respective blocks of pixels having a first number of pixels in a horizontal direction and a second number of pixels in a vertical direction; and for a first one of the respective blocks of pixels:

average values of the pixels in the first one of the respective blocks of pixels to determine a first mean value corresponding to the first one of the respective blocks of pixels; and set a first pixel of the second image to be the first mean value, the first pixel at a first position in the second image that is to represent the first one of the respective blocks of pixels of the first image.

4. The apparatus of claim 3, wherein the first number of pixels is two pixels, the second number of pixels is two pixels, the respective blocks of pixels of the first image each include four pixels, and the second image is one-fourth the size of the first image.

5. The apparatus of claim 1, wherein to classify the quality of the first image, the image classifier is to perform a single classification of the quality of the first image by:

classifying the first image as acceptable for an image auditing application when the output of the neural network satisfies a threshold; and classifying the first image as unacceptable for the image auditing application when the output of the neural network does not satisfy the threshold.

6. The apparatus of claim 1, wherein to classify the quality of the first image, the image classifier is to compare a plurality of outputs of the neural network to a plurality of thresholds to perform multiple classifications of the quality of the first image.

7. An image quality assessment method comprising:

training, by executing an instruction with a processor, a neural network, based on a set of training images, to classify quality of a first image;

replacing, by executing an instruction with the processor, respective blocks of pixels of the first image with mean values of the respective blocks of pixels to determine a second image having a smaller size than the first image;

determining, by executing an instruction with the processor, a vector of features including a blur feature value for the second image, the blur feature value determined based on an amount the second image differs from a version of the second image filtered with a blurring filter in horizontal and vertical directions of the second image;

applying the vector of features to the neural network after the neural network has been trained; and classifying, by executing an instruction with the processor, a quality of the first image based on an output of the neural network.

8. The method of claim 7, wherein the respective blocks of pixels of the first image form adjacent blocks of pixels that are non-overlapping.

9. The method of claim 7, wherein the replacing of the respective blocks of pixels of the first image with mean values of the respective blocks of pixels to determine the second image includes:

segmenting the first image into the respective blocks of pixels, the respective blocks of pixels having a first number of pixels in a horizontal direction and a second number of pixels in a vertical direction; and for a first one of the respective blocks of pixels:

averaging values of the pixels in the first one of the respective blocks of pixels to determine a first mean value corresponding to the first one of the respective blocks of pixels; and setting a first pixel of the second image to be the first mean value, the first pixel at a first position in the second image that is to represent the first one of the respective blocks of pixels of the first image.

10. The method of claim 9, wherein the first number of pixels is two pixels, the second number of pixels is two pixels, the respective blocks of pixels of the first image each include four pixels, and the second image is one-fourth the size of the first image.

11. The method of claim 7, further including converting the second image to a grayscale image before determining the vector of features for the second image.

12. The method of claim 7, wherein the classifying of the quality of the first image includes performing a single classification of the quality of the first image by:

classifying the first image as acceptable for an image auditing application when the output of the neural network satisfies a threshold; and classifying the first image as unacceptable for the image auditing application when the output of the neural network does not satisfy the threshold.

13. The method of claim 7, wherein the classifying of the quality of the first image includes comparing a plurality of outputs of the neural network to a plurality of thresholds to perform multiple classifications of the quality of the first image.

14. A tangible computer readable storage medium comprising computer readable instructions that, when executed, cause a processor to at least:

train a neural network, based on a set of training images, to classify quality of a first image;

replace respective blocks of pixels of the first image with mean values of the respective blocks of pixels to determine a second image having a smaller size than the first image;

determine a vector of features including a blur feature value for the second image, the blur feature value determined based on an amount the second image differs from a version of the second image filtered with a blurring filter in horizontal and vertical directions of the second image;

apply the vector of features to the neural network after the neural network has been trained; and classify a quality of the first image based on an output of the neural network.

15. The tangible computer readable storage medium of claim 14, wherein the respective blocks of pixels of the first image form adjacent blocks of pixels that are non-overlapping.

16. The tangible computer readable storage medium of claim 14, wherein to determine the second image, the instructions, when executed, further cause the processor to:

segment the first image into the respective blocks of pixels, the respective blocks of pixels having a first number of pixels in a horizontal direction and a second number of pixels in a vertical direction; and for a first one of the respective blocks of pixels:

average values of the pixels in the first one of the respective blocks of pixels to determine a first mean value corresponding to the first one of the respective blocks of pixels; and set a first pixel of the second image to be the first mean value, the first pixel at a first position in the second image that is to represent the first one of the respective blocks of pixels of the first image.

17. The tangible computer readable storage medium of claim 16, wherein the first number of pixels is two pixels, the second number of pixels is two pixels, the respective blocks of pixels of the first image each include four pixels, and the second image is one-fourth the size of the first image.

18. The tangible computer readable storage medium of claim 14, wherein the instructions, when executed, further cause the processor to convert the second image to a grayscale image before determining the vector of features for the second image.

19. The tangible computer readable storage medium of claim 14, wherein to classify the quality of the first image, the instructions, when executed, cause the processor to perform a single classification of the quality of the first image by:
   classifying the first image as acceptable for an image auditing application when the output of the neural network satisfies a threshold; and
   classifying the first image as unacceptable for the image auditing application when the output of the neural network does not satisfy the threshold.

20. The tangible computer readable storage medium of claim 14, wherein to classify the quality of the first image, the instructions, when executed, cause the processor to compare a plurality of outputs of the neural network to a plurality of thresholds to perform multiple classifications of the quality of the first image.

* * * * *